US012684141B2

(12) United States Patent
Tsai et al.

(10) Patent No.: US 12,684,141 B2
(45) Date of Patent: Jul. 14, 2026

(54) LINEAR MODEL DERIVATION FOR CROSS-COMPONENT PREDICTION BY MULTIPLE REFERENCE LINES

(71) Applicant: MEDIATEK INC., Hsinchu City (TW)

(72) Inventors: Chia-Ming Tsai, Hsinchu City (TW);
Chih-Wei Hsu, Hsinchu City (TW);
Ching-Yeh Chen, Hsinchu City (TW);
Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/858,968

(22) PCT Filed: Apr. 26, 2023

(86) PCT No.: PCT/CN2023/090940
§ 371 (c)(1),
(2) Date: Oct. 22, 2024

(87) PCT Pub. No.: WO2023/208063
PCT Pub. Date: Nov. 2, 2023

(65) Prior Publication Data
US 2025/0294171 A1     Sep. 18, 2025

Related U.S. Application Data

(60) Provisional application No. 63/334,733, filed on Apr. 26, 2022.

(51) Int. Cl.
*H04N 19/176*     (2014.01)
*H04N 19/105*     (2014.01)
(Continued)

(52) U.S. Cl.
CPC ......... *H04N 19/176* (2014.11); *H04N 19/105* (2014.11); *H04N 19/186* (2014.11); *H04N 19/59* (2014.11); *H04N 19/70* (2014.11)

(58) Field of Classification Search
None
See application file for complete search history.

(56) References Cited

U.S. PATENT DOCUMENTS

| 11,943,435 | B2 | 3/2024 | Zhao |
| 12,015,791 | B2 | 6/2024 | Wang |

(Continued)

FOREIGN PATENT DOCUMENTS

| CN | 111955007 A | 11/2020 |
| CN | 113994665 A | 1/2022 |

(Continued)

OTHER PUBLICATIONS

C. Gisquet and E. François, "Model Correction for Cross-Channel Chroma Prediction," 2013 Data Compression Conference, Snowbird, UT, USA, 2013, pp. 23-32, (Year: 2013).*

(Continued)

*Primary Examiner* — Stefan Gadomski
(74) *Attorney, Agent, or Firm* — McClure, Qualey & Rodack, LLP

(57) ABSTRACT

A video coding method that uses multiple reference lines for cross-component prediction is provided. A video coder receives data for a block of pixels to be encoded or decoded as a current block of a current picture. A video coder derives a linear model based on luma and chroma samples from one or more reference lines that are selected from a plurality of reference lines neighboring the current block at different distances. A video coder applies the linear model to luma samples of the current block to obtain predicted chroma samples of the current block. The video coder encodes or decodes the current block by using the predicted chroma samples of the current block. The linear model may be derived using luma and chroma samples of only one selected reference line, or of two or more selected reference lines.

15 Claims, 12 Drawing Sheets

(51) Int. Cl.
    *H04N 19/186*     (2014.01)
    *H04N 19/59*     (2014.01)
    *H04N 19/70*     (2014.01)

(56)         References Cited

U.S. PATENT DOCUMENTS

| 2019/0182481 | A1* | 6/2019 | Lee | H04N 19/103 |
|---|---|---|---|---|
| 2019/0238835 | A1* | 8/2019 | Lee | H04N 19/119 |
| 2019/0306498 | A1* | 10/2019 | Zhao | H04N 19/184 |
| 2020/0007879 | A1* | 1/2020 | Jiang | H04N 19/70 |
| 2020/0252614 | A1* | 8/2020 | Choi | H04N 19/117 |
| 2021/0266558 | A1* | 8/2021 | Racape | H04N 19/159 |
| 2021/0409761 | A1* | 12/2021 | Jiang | H04N 19/593 |
| 2022/0046232 | A1* | 2/2022 | Piao | H04N 19/176 |
| 2022/0109846 | A1* | 4/2022 | Lim | H04N 19/159 |
| 2022/0264098 | A1 | 8/2022 | Zhao | |
| 2022/0360799 | A1* | 11/2022 | Wang | H04N 19/82 |
| 2023/0055874 | A1* | 2/2023 | Hendry | H04N 19/132 |
| 2023/0096855 | A1* | 3/2023 | Hendry | H04N 19/46 375/240.02 |
| 2023/0262223 | A1* | 8/2023 | Ghaznavi Youvalari | H04N 19/159 375/240.02 |
| 2025/0063179 | A1* | 2/2025 | Choi | H04N 19/132 |

FOREIGN PATENT DOCUMENTS

| WO | 2020149630 A1 | 7/2020 |
|---|---|---|
| WO | 2021034116 A1 | 2/2021 |

OTHER PUBLICATIONS

International Search Report and Written Opinion dated Aug. 10, 2023, issued in application No. PCT/CN2023/090940.

* cited by examiner

● Luma samples
○ Chroma samples

LINEAR MODEL DERIVATION FOR CROSS-COMPONENT PREDICTION BY MULTIPLE REFERENCE LINES

CROSS REFERENCE TO RELATED PATENT APPLICATION(S)

The present disclosure is part of a non-provisional application that claims the priority benefit of U.S. Provisional Patent Application No. 63/334,733, filed on 26 Apr. 2022. Content of above-listed application is herein incorporated by reference.

TECHNICAL FIELD

The present disclosure relates generally to video coding. In particular, the present disclosure relates to coding pixel blocks by cross-component prediction.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types:

quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For each inter-predicted CU, motion parameters consisting of motion vectors, reference picture indices and reference picture list usage index, and additional information are used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU. The alternative to merge mode is the explicit transmission of motion parameters, where motion vector, corresponding reference picture index for each reference picture list and reference picture list usage flag and other needed information are signalled explicitly per each CU.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

A video coding method that uses multiple reference lines for cross-component prediction is provided. A video coder receives data for a block of pixels to be encoded or decoded as a current block of a current picture. A video coder derives a linear model based on luma and chroma samples from one or more reference lines that are selected from a plurality of reference lines neighboring the current block at different distances. A video coder applies the linear model to luma samples of the current block to obtain predicted chroma samples of the current block. The video coder encodes or decodes the current block by using the predicted chroma samples of the current block.

In some embodiments, at least one of the selected reference lines is adjacent to a boundary of the current block. In some embodiments, at least one of the selected reference lines is non-adjacent to a boundary of the current block. In some embodiments, the linear model is derived using luma and chroma samples of only one selected reference line. In some embodiments, the linear model is derived using luma and chroma samples of two or more selected reference lines. The two or more selected reference lines may or may not be adjacent to each other. In some embodiments, the luma samples and the chroma samples used for deriving the linear model may be of same or different selected reference lines. In some embodiments, the luma samples used for deriving the linear model are sub-sampled without applying a down-sampling filtering process.

In some embodiments, the encoder signals a syntax element indicating whether more than one reference lines is selected from the plurality of reference lines for deriving the linear model. In some embodiments, the number of reference lines selected from the plurality of reference lines is determined based on a size of the current block or a cross-component prediction mode used for the current block.

In some embodiments, the luma samples in the plurality of reference lines are combined into a line of fused luma samples and the chroma samples in the plurality of reference lines are combined onto a line of fused chroma samples. The linear model is derived based on the line of fused luma samples and the line of fused chroma samples. Each fused sample is a weighted average of samples within a window that encompass multiple reference lines.

In some embodiments, the linear model is derived from samples of one particular reference line that is selected from the plurality of reference lines for having a smallest boundary matching cost. The boundary matching cost of a reference line is determined based on a difference between (i) boundary chroma samples of the current block predicted by a candidate model of the reference line (by applying the candidate model to the boundary luma samples of the current block) and (ii) reconstructed chroma samples neighboring the current block.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Cross Component Linear Model (CCLM)

Cross Component Linear Model (CCLM) or Linear Model (LM) mode is a cross component prediction mode in which chroma components of a block is predicted from the collocated reconstructed luma samples by linear models. The parameters (e.g., scale and offset) of the linear model are derived from already reconstructed luma and chroma samples that are adjacent to the block. For example, in VVC, the CCLM mode makes use of inter-channel dependencies to predict the chroma samples from reconstructed luma samples. This prediction is carried out using a linear model in the form of:

$$P(i, j) = \alpha \cdot rec'_L(i, j) + \beta \qquad \text{eq. (1)}$$

P(i, j) in eq. (1) represents the predicted chroma samples in a CU (or the predicted chroma samples of the current CU) and $rec'_L(i, j)$ represents the down-sampled reconstructed luma samples of the same CU (or the corresponding reconstructed luma samples of the current CU).

The CCLM model parameters $\alpha$ (scaling parameter) and $\beta$ (offset parameter) are derived based on at most four neighboring chroma samples and their corresponding down-sampled luma samples. In LM_A mode (also denoted as LM-T mode), only the above or top-neighboring template is used to calculate the linear model coefficients. In LM_L mode (also denoted as LM-L mode), only left template is used to calculate the linear model coefficients. In LM-LA mode (also denoted as LM-LT mode), both left and above templates are used to calculate the linear model coefficients.

Figure 1:
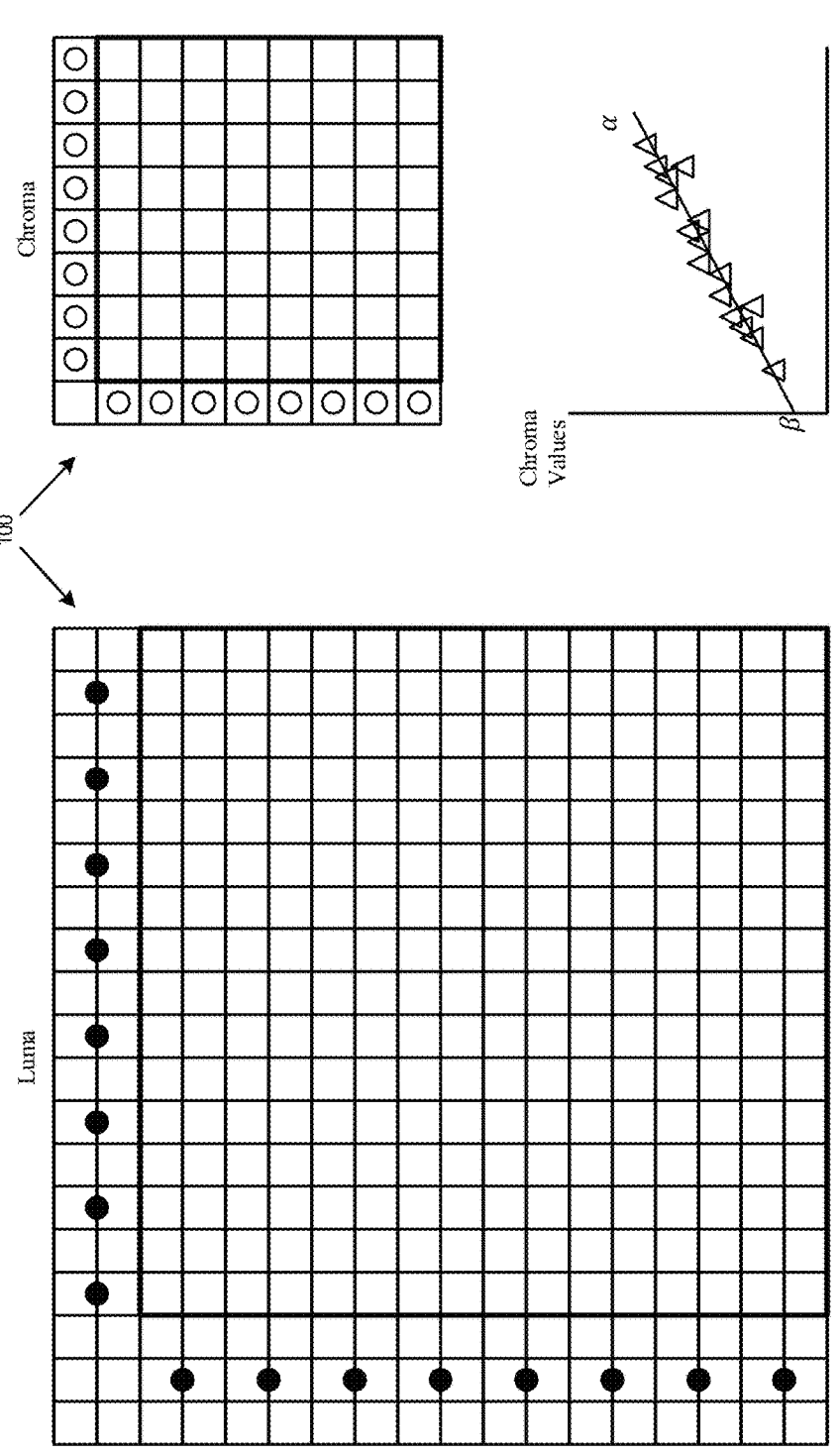
FIG. 1 conceptually illustrates chroma and luma samples that are used for derivation of linear model parameters.

FIG. 1 conceptually illustrates chroma and luma samples that are used for derivation of linear model parameters. The figure illustrates a current block 100 having luma component samples and chroma component samples in 4:2:0 format. The luma and chroma samples neighboring the current block are reconstructed samples. These reconstructed samples are used to derive the cross-component linear model (parameters $\alpha$ and $\beta$). Since the current block in in 4:2:0 format, the luma samples are down-sampled first before being used for linear model derivation. In the example, there are 16 pairs of reconstructed luma (down-sampled) and chroma samples neighboring the current block. These 16 pairs of luma versus chroma values are used to derive the linear model parameters.

Suppose the current chroma block dimensions are W×H, then W' and H' are set as

W'=W, H'=H when LM-LT mode is applied;

W'=W+H when LM-T mode is applied;

H'=H+W when LM-L mode is applied

The above neighboring positions are denoted as S[0, −1] . . . S[W'−1, −1] and the left neighboring positions are denoted as S[−1, 0] . . . S[−1, H'−1]. Then the four samples are selected as S[W'/4, −1], S[3*W'/4, −1], S[−1, H'/4], S[−1, 3*H'/4] when LM mode is applied (both above and left neighboring samples are available);

S[W'/8, −1], S[3*W'/8, −1], S[5*W'/8, −1], S[7*W'/8, −1] when LM-T mode is applied (only the above neighboring samples are available);

S[−1, H'/8], S[−1, 3*H'/8], S[−1, 5*H'/8], S[−1, 7*H'/8] when LM-L mode is applied (only the left neighboring samples are available);

The four neighboring luma samples at the selected positions are down-sampled and compared four times to find two larger values:

$$x_A^0$$

and $$x_A^1,$$

and two smaller values:

$$x_B^0 \text{ and } x_B^1.$$

Their corresponding chroma sample values are denoted as $$y_A^0, y_A^1, y_B^0 \text{ and } y_B^1.$$

Then $X_A$, $X_B$, $Y_A$ and $Y_B$ are derived as:

$$X_a = \left(x_A^0 + x_A^1 + 1\right) >> 1; X_b = \left(x_B^0 + x_B^1 + 1\right) >> 1; \qquad \text{eq. (2)}$$

$$Y_a = \left(y_A^0 + y_A^1 + 1\right) >> 1; Y_b = \left(y_B^0 + y_B^1 + 1\right) >> 1 \qquad \text{eq. (3)}$$

The linear model parameters $\alpha$ and $\beta$ are obtained according to the following equations $$\alpha = \frac{Y_a - Y_b}{X_a - X_b} \qquad \text{eq. (4)}$$

$$\beta = Y_b - \alpha \cdot X_b \qquad \text{eq. (5)}$$

The operations to calculate the $\alpha$ and $\beta$ parameters according to eq. (4) and (5) may be implemented by a look-up table. In some embodiments, to reduce the memory required for storing the look-up table, the diff value (difference between maximum and minimum values) and the parameter $\alpha$ are expressed by an exponential notation. For example, diff is approximated with a 4-bit significant part and an exponent. Consequently, the table for 1/diff is reduced to 16 elements for 16 values of the significand as follows:

$$\text{DivTable}[\ ] = \{0,7,6,5,5,4,4,3,3,2,2,1,1,1,1,0\} \qquad \text{eq. (6)}$$

This reduces the complexity of the calculation as well as the memory size required for storing the needed tables.

In some embodiments, to get more samples for calculating the CCLM model parameters $\alpha$ and $\beta$, the above template is extended to contain (W+H) samples for LM-T mode, the left template is extended to contain (H+W) samples for LM-L mode. For LM-LT mode, both the extended left template and the extended above templates are used to calculate the linear model coefficients.

To match the chroma sample locations for 4:2:0 video sequences, two types of down-sampling filters are applied to luma samples to achieve 2 to 1 down-sampling ratio in both horizontal and vertical directions. The selection of down-sampling filter is specified by a sequence parameter set (SPS) level flag. The two down-sampling filters are as follows, which correspond to "type-0" and "type-2" content, respectively.

$$rec_L'(i, j) = [rec_L(2i - 1, 2j - 1) + 2j - 1) + \qquad \text{eq. (7)}$$

$$2 * rec_L(2i - 1, 2j - 1) + rec_L(2i + 1, 2j - 1) +$$

$$rec_L(2i - 1, 2j) + rec_L(2i + 1, 2j) + 4] >> 3$$

$$rec_L'(i, j) = [rec_L(2i, 2j - 1) + rec_L(2i - 1, 2j) + \qquad \text{eq. (8)}$$

$$4 * rec_L(2i, 2j) + rec_L(2i + 1, 2j) + rec_L(2i, 2j + 1) + 4] >> 3$$

In some embodiments, only one luma line (general line buffer in intra prediction) is used to make the down-sampled luma samples when the upper reference line is at the CTU boundary.

In some embodiments, the $\alpha$ and $\beta$ parameters computation is performed as part of the decoding process, and is not just as an encoder search operation. As a result, no syntax is used to convey the $\alpha$ and $\beta$ values to decoder.

For chroma intra mode coding, a total of 8 intra modes are allowed. Those modes include five traditional intra modes and three cross-component linear model modes (LM_LA, LM_A, and LM_L). Chroma intra mode coding may directly depends on the intra prediction mode of the corresponding luma block. Chroma intra mode signaling and corresponding luma intra prediction modes are according to the following table:

| Chroma Intra Prediction | Corresponding Luma Intra Prediction | | | | |
|---|---|---|---|---|---|
| | Mode | | | | |
| Mode | 0 | 50 | 18 | 1 | X(0 ≤ X ≤ 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

Since separate block partitioning structure for luma and chroma components is enabled in I slices, one chroma block may correspond to multiple luma blocks. Therefore, for chroma derived mode (DM) mode, the intra prediction mode of the corresponding luma block covering the center position of the current chroma block is directly inherited.

A single unified binarization table (mapping to bin string) is used for chroma intra prediction mode according to the following table

| Chroma intra prediction mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In the Table, the first bin indicates whether it is regular (0) or LM mode (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in the table are context coded with its own context model, and the rest bins are bypass coded.

In addition, in order to reduce luma-chroma latency in dual tree, when the 64×64 luma coding tree node is not split (and ISP is not used for the 64×64 CU) or partitioned with QT, the chroma CUs in 32×32/32×16 chroma coding tree node are allowed to use CCLM in the following way:

If the 32×32 chroma node is not split or partitioned with QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

II. Multi-Model CCLM (MMLM)

Multiple model CCLM mode (MMLM) uses two models for predicting the chroma samples from the luma samples for the whole CU. Similar to CCLM, three multiple model CCLM modes (MMLM_LA, MMLM_A, and MMLM_L)

are used to indicate if both above and left neighboring samples, only above neighboring samples, or only left neighboring samples are used in model parameters derivation.

In MMLM, neighbouring luma samples and neighbouring chroma samples of the current block are classified into two groups, each group is used as a training set to derive a linear model (i.e., a particular $\alpha$ and $\beta$ are derived for a particular group). Furthermore, the samples of the current luma block are also classified based on the same rule for the classification of neighbouring luma samples.

Figure 2:
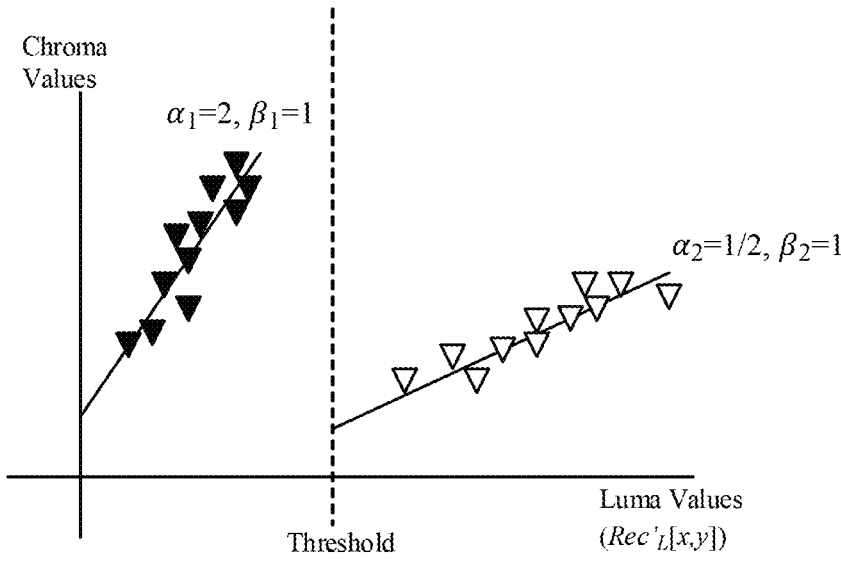
FIG. 2 shows an example of classifying the neighbouring samples into two groups.

FIG. 2 shows an example of classifying the neighbouring samples into two groups. Threshold is calculated as the average value of the neighbouring reconstructed luma samples. A neighbouring sample at [x, y] with $Rec'_L[x, y] \leq$ Threshold is classified into group 1; while a neighbouring sample at [x, y] with $Rec'_L[x, y] >$ Threshold is classified into group 2. Thus, the multi-model CCLM prediction for the chroma samples is:

$$Pred_c[x, y] = \alpha_1 \times Rec'_L[x, y] + \beta_1 \text{ if } Rec'_L[x, y] \leq \text{Threshold} \qquad \text{eq. (9)}$$

$$Pred_c[x, y] = \alpha_2 \times Rec'_L[x, y] + \beta_2 \text{ if } Rec'_L[x, y] > \text{Threshold}$$

III. Linear Model Based on Multiple Reference Lines

A. Using Multiple Reference Lines

Figure 3:
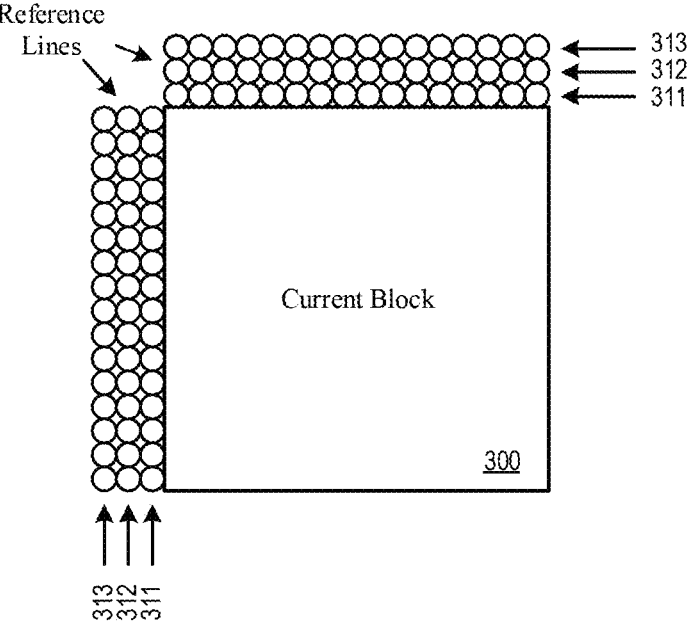
FIG. 3 illustrates multiple reference lines of a current block that are used for cross component prediction.

In some embodiments, if chroma component or luma component of the current block has multiple neighboring reference lines, the neighboring samples for deriving model parameters for cross-component prediction (e.g., CCLM/MMLM) may be adaptively derived based on reference line selection. FIG. 3 illustrates multiple reference lines of a current block 300 that are used for cross component prediction. As illustrated, the current block 300 has multiple reference lines 311-313, each reference line being a line of reconstructed (top and left) neighboring pixels of the current block. In the example, the reference lines 311-313 are at different distances from the boundary of the current block, with the reference line 311 being the line closest to the current block boundary while the reference line 313 being the farthest from the current block boundary.

In some embodiments, if the current block has N neighboring reference lines, the i-th neighboring reference line may be selected for deriving the model parameters for CCLM/MMLM, where N>1 and N≥i≥1. In some embodiments, if the current block has N neighboring reference lines, more than one reference lines may be selected for deriving the model parameters for CCLM/MMLM. For example, if the current block has N neighboring reference lines, the video coder may select 2 out of N, 3 out of N, . . . , or N out of N neighboring reference lines for deriving the model parameters.

In some embodiments, if multiple reference lines are selected, the selected reference lines may or may not be adjacent to each other. For example, if two out of N neighboring reference lines are selected, the two selected lines may be the $1^{st}$ and $2^{nd}$ reference lines, but may also be $1^{st}$ and $3^{rd}$ reference lines, $2^{nd}$ and $4^{th}$ reference lines, $1^{st}$ and $4^{th}$ reference lines, etc.

In some embodiments, if a chroma neighboring reference line is selected for CCLM/MMLM model derivation, the video coder may select a luma reference line that may or may not correspond to the selected chroma reference line. For example, if the i-th luma neighboring reference line is selected, the video coder may choose the j-th chroma neighboring reference line, where i and j may be different or the same.

Figure 4:
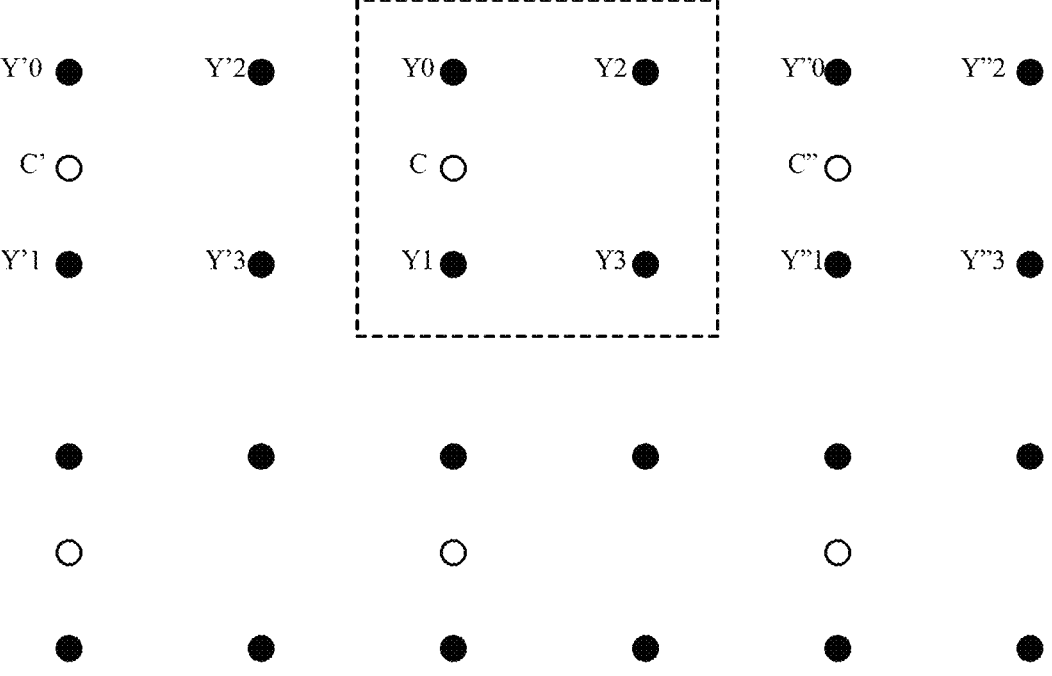
FIG. 4 illustrates luma and chroma samples being used to derive model parameters without luma sub-sampling.

In some embodiments, the video coder may use luma reference line samples without performing luma down-sampling process when deriving the model parameters. FIG. 4 illustrates luma and chroma samples being used to derive model parameters without luma sub-sampling. In the figure, the color components are in a 4:2:0 format, with various luma sample phases are marked in darkened circles and chroma sample phase marked in hollow circles. A set 410 of luma samples Y0, Y1, Y2, Y3 is associated with a chroma sample C. An adjacent set 411 of luma samples Y'0, Y'1, Y'2, Y'3 is associated with chroma sample C'. Another adjacent set 412 of luma samples Y"0, Y"1, Y"2, Y"3 is associated with chroma sample C". The video coder may choose one of {Y0, Y1, (Y0+Y2+1)>>1, (Y'2+(Y0<<1)+Y2+2)>>2, (Y0+(Y2<<1)+Y"0+2)>>2, or (Y0+Y2−Y'2)} at a specified neighboring luma line to derive the model parameters, without applying a luma down-sampling filter. For another example, the video coder may choose one of {Y1, Y3, (Y1+Y3+1)>>1, (Y'3+(Y1<<1)+Y3+2)>>2, (Y1+(Y3<<1)+Y"1+2)>>2, or (Y1+Y3−Y'3)} at a specified neighboring luma line to derive the model parameters, without applying a luma down-sampling filter.

In some embodiments, if more than one neighboring reference line is used for CCLM/MMLM model derivation, the luma down-sampling filters for different reference lines may be different. For example, if two reference lines are used for CCLM/MMLM model derivation, the down-sampling filter used to output the selected line closer to the current block boundary may be a m-tap high-pass or low-pass filter, while the down-sampling filter used to output the line farther from the current block boundary may be a n-tap high-pass or low-pass filter. In some embodiments, m is 6, and n is 4. In some embodiments, m is greater than n. In some embodiments, m is less than n.

In some embodiments, if a reference line of multiple reference lines is invalid due to the neighboring samples being not available or due to CTU row buffer size constraints, the video coder may use another valid reference line to replace the invalid reference line. For example, as the three reference lines 311-313 shown in FIG. 3, if the $3^{rd}$ reference line 313 is invalid but the 1st and the $2^{nd}$ reference lines 311-312 are valid, the video coder may use the $1^{st}$ (or the $2^{nd}$) reference line to be used in place of the $3^{rd}$ reference line. In some embodiments, only the valid reference line is used in cross component model derivation, such that the invalid reference line is not used in cross component model derivation.

B. Fusing Multiple Reference Lines

In some embodiments, if chroma component or luma component of the current block has multiple neighboring reference lines, the video coder may combine or fuse multiple neighboring reference lines into one line to derive model parameters for CCLM/MMLM. Thus, luma samples in multiple reference lines are combined into one line of fused luma samples, and chroma samples in multiple reference lines are combined into one line of fused chroma samples. The one line of fused luma samples and the one line of fused chroma samples are then used to derive the linear model for CCLM or MMLM.

Figure 5A:
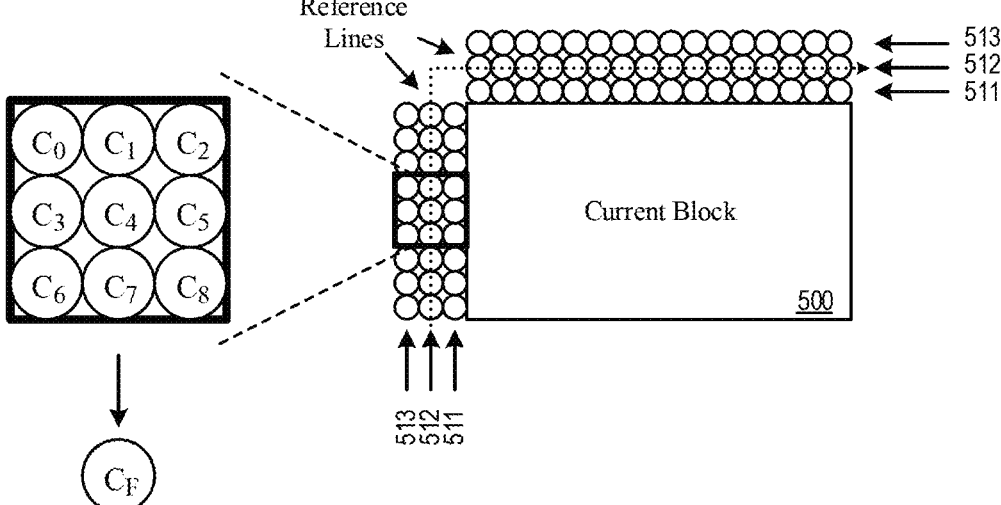
FIGS. 5A-B conceptually illustrates combining multiple neighboring reference lines into one line for deriving model parameters for cross-component prediction.
Figure 5B:
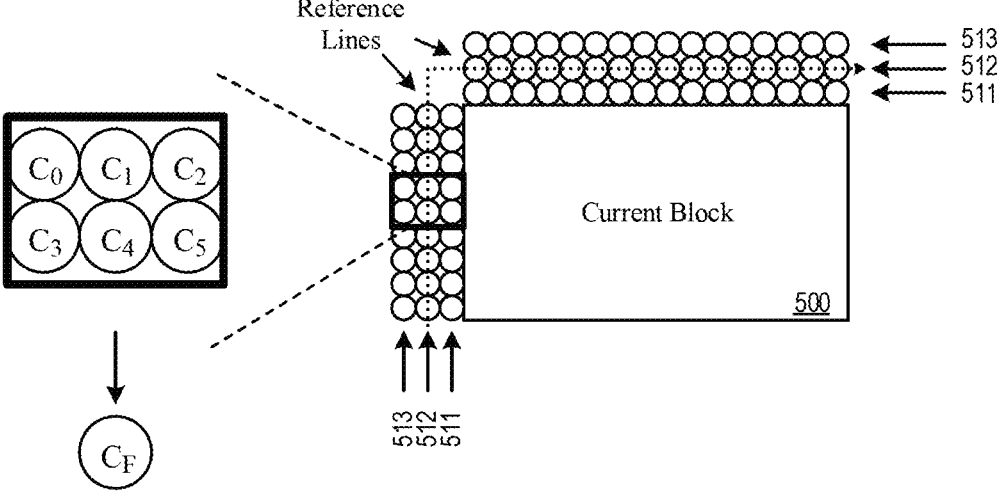

FIGS. 5A-B conceptually illustrates combining multiple neighboring reference lines into one line for deriving model parameters for cross-component prediction. FIG. 5A illustrates a current block 500 having three available neighboring reference lines 511-513. The video coder is using a 3×3 window to combine the three neighboring reference lines into one fused line, specifically by performing weighted averaging of samples within a moving window. The figure shows an example 3×3 window that is used to combine the 3 neighboring lines of samples $C_i$, which can be luma or chroma. The combined result (or the fused sample $C_F$) of the 3×3 window is formulated as $$\left(\Sigma_{i=0}^{8} w_i \times C_i + b\right), w_i$$

may be a positive or negative value or 0, and b is an offset value. Similarly, as the video coder may use a 3×2 window to combine the three neighboring reference lines first.

FIG. 5B shows using a 3×2 window to combine the 3 neighboring lines. The combined result (or the fused sample $C_F$) of the 3×2 window is formulated as $$\left(\Sigma_{i=0}^{5} w_i \times C_i + b\right),$$

where $w_i$ could be a positive or negative value, b is an offset value.

More generally, a formula $$\left(\Sigma_{i=0}^{S} w_i \times L_i + b\right)$$

may be used for fusing luma samples of multiple lines, and a formula $$\left(\Sigma_{i=0}^{S} w_i \times C_i + b\right)$$

may be used for fusing chroma samples of multiple lines, where $L_i$ and $C_i$ are the neighboring luma and chroma samples, S is the applied window size, $w_i$ may be a positive or negative value or 0, b is an offset value.

C. Signaling for Selection of Reference Line(s) for Model Derivation

In some embodiments, the video coder may select a neighboring reference line from multiple different neighboring reference lines for CCLM/MMLM model derivation of the current block. Such a selection may be explicitly determined or implicitly derived. For example, if one or two reference lines are allowed for the current block, and the selected lines of CCLM/MMLM is explicitly determined, a first bin is used to indicate if one line or two line is used. Then, a second bin or more bins (coded by truncate unary or fix length code) are used to indicate which reference line or what lines combination is selected. For example, if one reference line is used for model derivation, the second bin (or more bins) may be used to choose from among {$1^{st}$ line, $2^{nd}$ line, $3^{rd}$ line . . . }. If two reference lines are used for model derivation, the second bin (or more bins) may be used to choose from among {$1^{st}$ line+$2^{nd}$ line, $2^{nd}$ line+$3^{rd}$ line, $1^{st}$ line+$3^{rd}$ line . . . }.

The selection of the reference lines for CCLM/MMLM model derivation may also be implicitly derived by using decoder side tools, e.g., by the template cost or boundary matching. For example, in some embodiments, at the decoder side, the final line selection for CCLM/MMLM model is implicitly determined to be the reference line(s)

that minimize(s) the difference of the boundary samples of the current block and the neighboring samples, in other words, the reference line that minimize the distortion of neighboring templates.

For example, after deriving the parameters of a CCLM/ MMLM model by using a certain reference line, the model is applied to the luma samples of the boundary to calculate the cost of the derived model (by comparing the model-predicted boundary chroma sample with the chroma sample of the neighboring template.) The video coder then derives the parameters of another CCLM/MMLM model by using another reference line, and then calculate the cost of the derived model. This process is continuously applied to other models (of other reference lines) to calculate their costs, and the model (and hence the reference line) that result in the lowest prediction cost for the neighboring template is implicitly selected. The final chroma prediction of the current block is then calculated by using the selected model.

Figure 6:
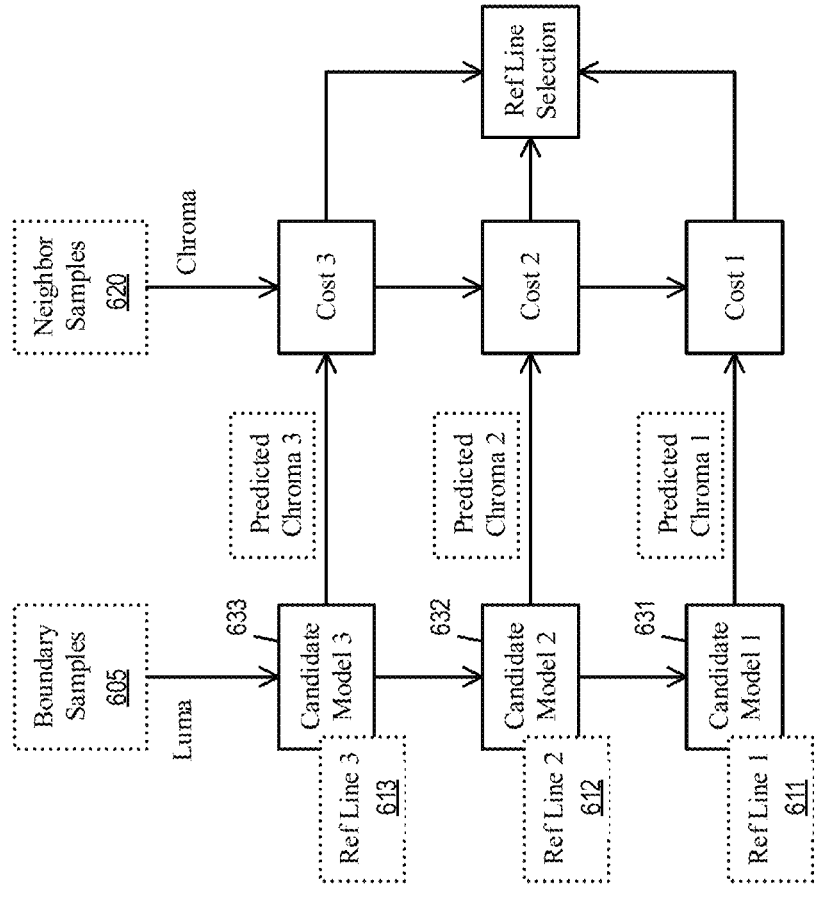
FIG. 6 conceptually illustrates implicit selection of a reference line of a current block.
Figure 6:
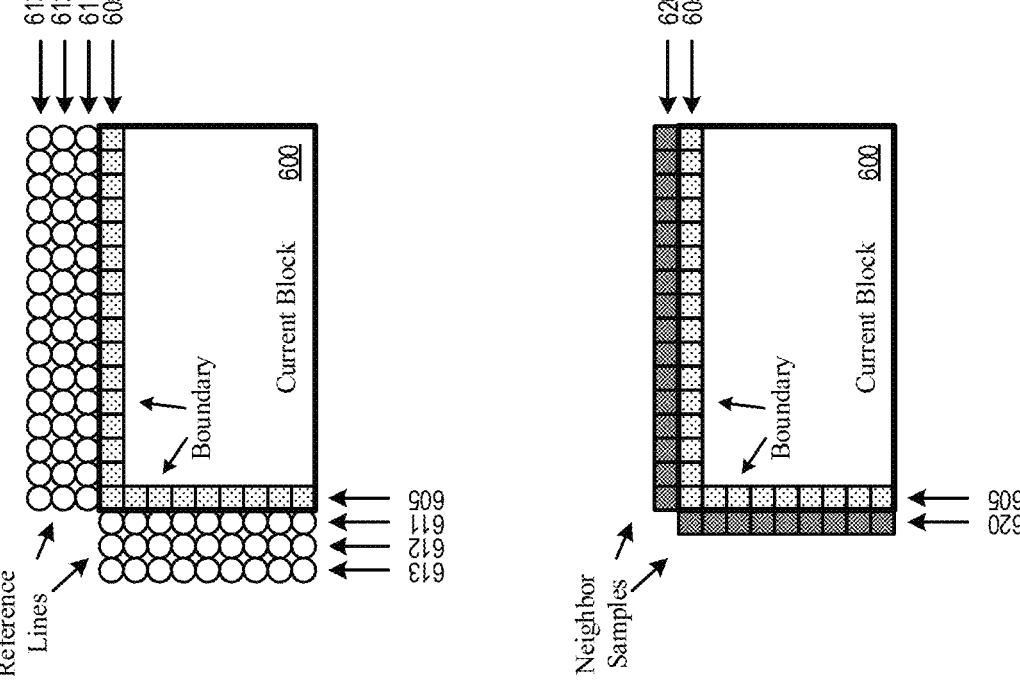

FIG. 6 conceptually illustrates implicit selection of a reference line of a current block 600. The current block has boundary samples 605, for which the luma samples are already reconstructed. The lines 611-613 neighboring the current block 600 are used as neighboring reference lines. Reconstructed neighboring samples above and left of the current block are used as a neighboring template 620.

The luma and chroma samples of the reference lines 611-613 are used to generate corresponding candidate models 631-633, respectively. The neighboring template 620 may include some of the reference lines 611-613 (e.g., the samples of the reference line 611 that are adjacent to the current block 600.)

The video coder applies each of the candidate models 631-633 to the luma component of the boundary samples 605 to predict the corresponding chroma component. The predicted chroma samples of the boundary 605 produced by each linear model are compared with the chroma samples of neighboring template 620 (the current above/left neighboring samples) to determine the cost (e.g., SATD) of the candidate model. The reference line that generates the candidate model that minimizes the cost is implicitly selected (by both encoder and decoder) as the CCLM/ MMLM model for the current block.

In some embodiments, the usage of more than one reference lines may depend on the current block size for deriving the model for different CCLM/MMLM modes (e.g., LM_A, LM_L, LM_LA). For example, in some embodiments, if the current block width is less than a threshold, more than one reference lines are used in CCLM_A or MMLM_A (used to derive the cross-component linear model). Similarly, in some embodiments, if the current block height is less than a threshold, then more than one reference lines are used in CCLM_L or MMLM_L. In some embodiments, if the (width+height) of the current block is less than a threshold, then more than one reference lines are used in CCLM_LA or MMLM_LA. In some embodiments, if the area of the current block is less than a threshold, then more than two reference lines are used in CCLM or MMLM. In some embodiments, more than one reference lines are used in CCLM_A, CCLM_L, MMLM_A, or MMLM_L. In some embodiments, a syntax is signaled at SPS, PPS, PH, SH, CTU, CU, or PU level to indicate if more than one reference lines is allowed for the current block.

IV. Example Video Encoder

Figure 7:
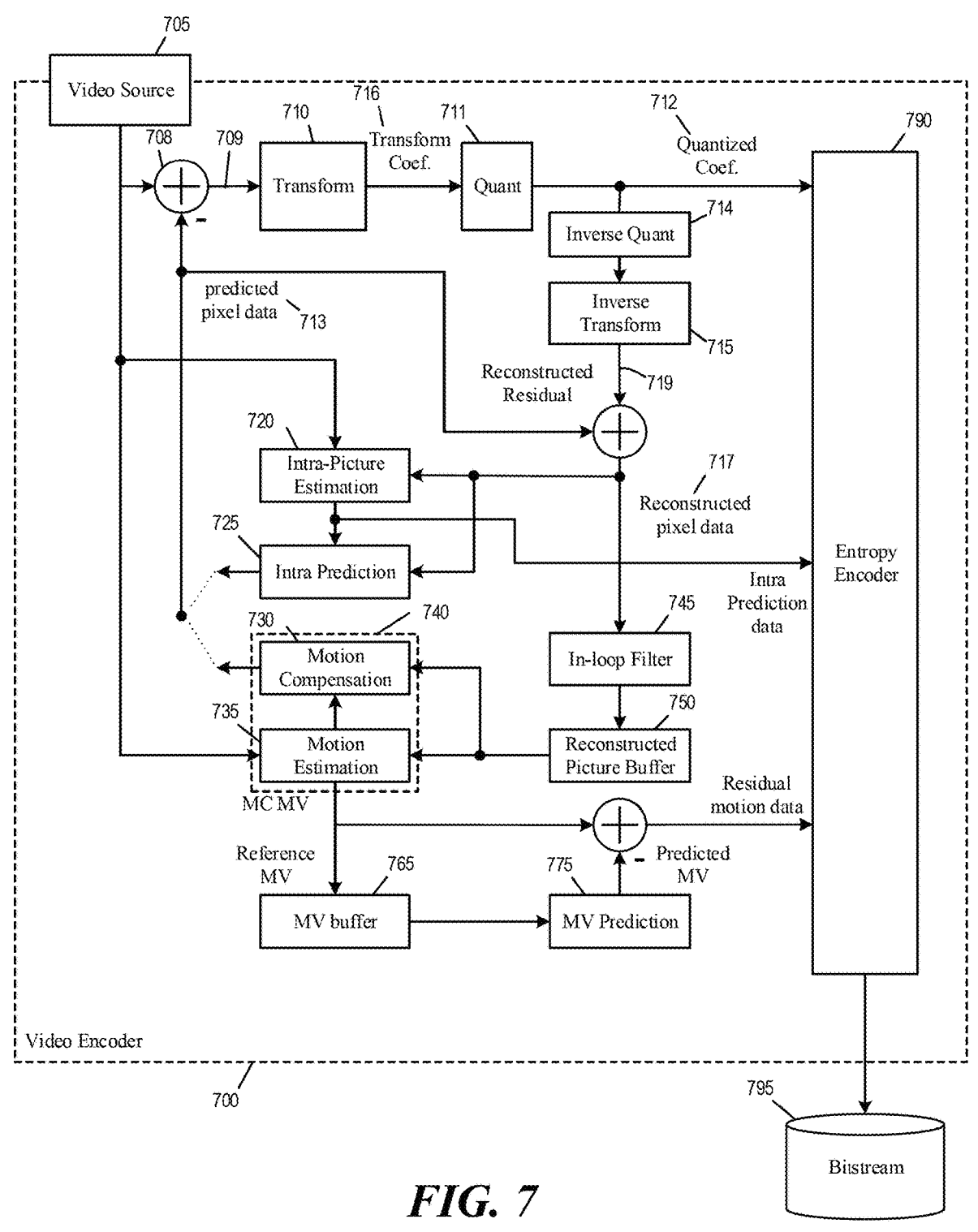
FIG. 7 illustrates an example video encoder that may implement cross-component prediction.

FIG. 7 illustrates an example video encoder 700 that may implement cross-component prediction. As illustrated, the video encoder 700 receives input video signal from a video source 705 and encodes the signal into bitstream 795. The video encoder 700 has several components or modules for encoding the signal from the video source 705, at least including some components selected from a transform module 710, a quantization module 711, an inverse quantization module 714, an inverse transform module 715, an intra-picture estimation module 720, an intra-prediction module 725, a motion compensation module 730, a motion estimation module 735, an in-loop filter 745, a reconstructed picture buffer 750, a MV buffer 765, and a MV prediction module 775, and an entropy encoder 790. The motion compensation module 730 and the motion estimation module 735 are part of an inter-prediction module 740.

In some embodiments, the modules 710-790 are modules of software instructions being executed by one or more processing units (e.g., a processor) of a computing device or electronic apparatus. In some embodiments, the modules 710-790 are modules of hardware circuits implemented by one or more integrated circuits (ICs) of an electronic apparatus. Though the modules 710-790 are illustrated as being separate modules, some of the modules can be combined into a single module.

The video source 705 provides a raw video signal that presents pixel data of each video frame without compression. A subtractor 708 computes the difference between the raw video pixel data of the video source 705 and the predicted pixel data 713 from the motion compensation module 730 or intra-prediction module 725 as prediction residual 709. The transform module 710 converts the difference (or the residual pixel data or residual signal 708) into transform coefficients (e.g., by performing Discrete Cosine Transform, or DCT). The quantization module 711 quantizes the transform coefficients into quantized data (or quantized coefficients) 712, which is encoded into the bitstream 795 by the entropy encoder 790.

The inverse quantization module 714 de-quantizes the quantized data (or quantized coefficients) 712 to obtain transform coefficients, and the inverse transform module 715 performs inverse transform on the transform coefficients to produce reconstructed residual 719. The reconstructed residual 719 is added with the predicted pixel data 713 to produce reconstructed pixel data 717. In some embodiments, the reconstructed pixel data 717 is temporarily stored in a line buffer (not illustrated) for intra-picture prediction and spatial MV prediction. The reconstructed pixels are filtered by the in-loop filter 745 and stored in the reconstructed picture buffer 750. In some embodiments, the reconstructed picture buffer 750 is a storage external to the video encoder 700. In some embodiments, the reconstructed picture buffer 750 is a storage internal to the video encoder 700.

The intra-picture estimation module 720 performs intra-prediction based on the reconstructed pixel data 717 to produce intra prediction data. The intra-prediction data is provided to the entropy encoder 790 to be encoded into bitstream 795. The intra-prediction data is also used by the intra-prediction module 725 to produce the predicted pixel data 713.

The motion estimation module 735 performs inter-prediction by producing MVs to reference pixel data of previously decoded frames stored in the reconstructed picture buffer 750. These MVs are provided to the motion compensation module 730 to produce predicted pixel data.

Instead of encoding the complete actual MVs in the bitstream, the video encoder 700 uses MV prediction to generate predicted MVs, and the difference between the MVs used for motion compensation and the predicted MVs is encoded as residual motion data and stored in the bitstream 795.

The MV prediction module 775 generates the predicted MVs based on reference MVs that were generated for encoding previously video frames, i.e., the motion compensation MVs that were used to perform motion compensation. The MV prediction module 775 retrieves reference MVs from previous video frames from the MV buffer 765. The video encoder 700 stores the MVs generated for the current video frame in the MV buffer 765 as reference MVs for generating predicted MVs.

The MV prediction module 775 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 795 by the entropy encoder 790.

The entropy encoder 790 encodes various parameters and data into the bitstream 795 by using entropy-coding techniques such as context-adaptive binary arithmetic coding (CABAC) or Huffman encoding. The entropy encoder 790 encodes various header elements, flags, along with the quantized transform coefficients 712, and the residual motion data as syntax elements into the bitstream 795. The bitstream 795 is in turn stored in a storage device or transmitted to a decoder over a communications medium such as a network.

The in-loop filter 745 performs filtering or smoothing operations on the reconstructed pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
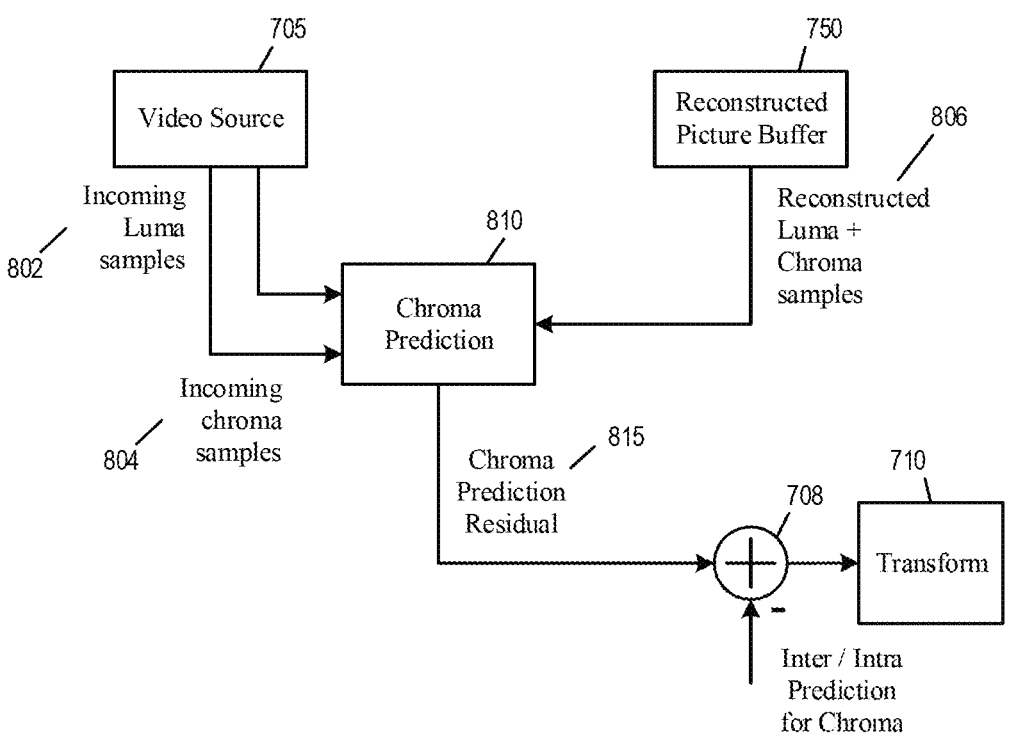
FIG. 8 illustrates portions of the video encoder that implement linear model derivation based on multiple reference lines.
Figure 8:
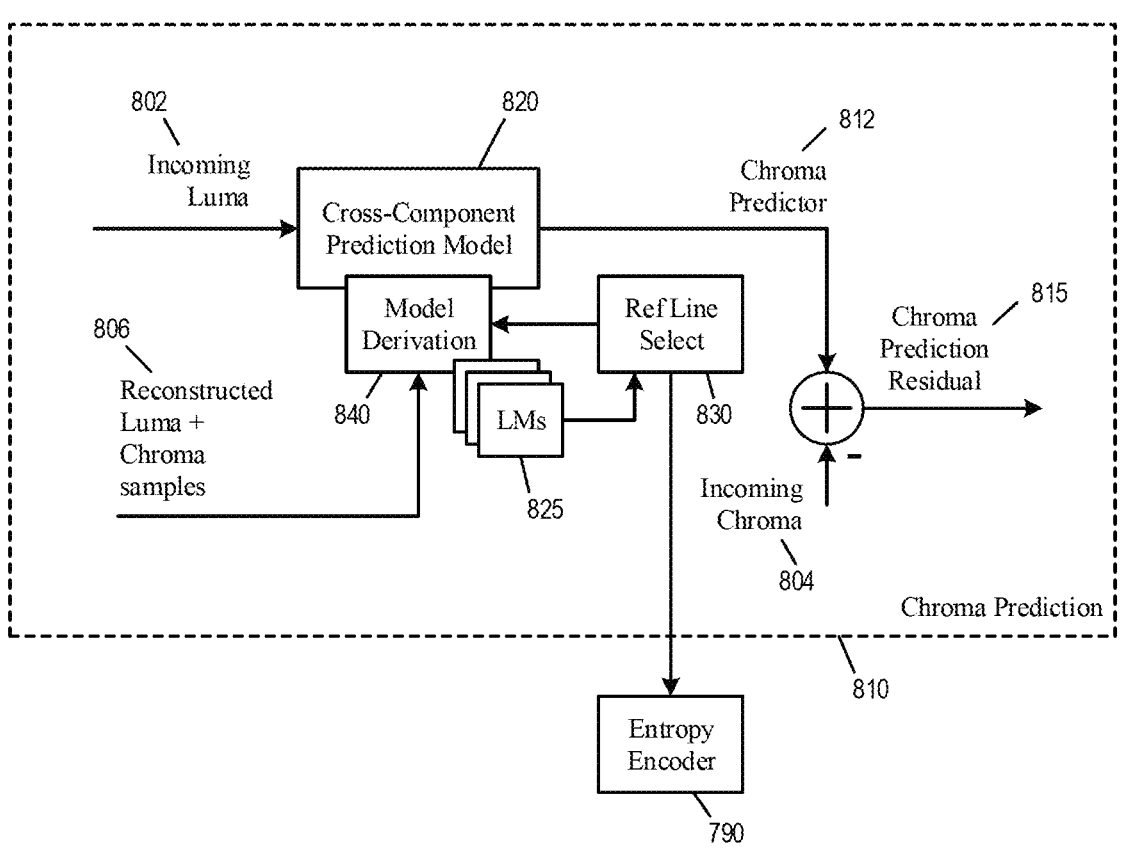

FIG. 8 illustrates portions of the video encoder 700 that implement linear model derivation based on multiple reference lines. As illustrated, the video source 705 provides incoming luma and chroma samples 802 and 804, while the reconstructed picture buffer 750 provides reconstructed luma and chroma samples 806.

A chroma prediction module 810 is applied to the incoming luma samples 802 to generate a chroma predictor 812. The chroma predictor 812 is then used to produce the chroma prediction residual 815 by subtracting the incoming chroma samples 804. The chroma prediction residual signal 815 is encoded (transformed, inter/intra predicted, etc.) in place of regular chroma samples.

The cross-component prediction model 820 is a linear model for cross-component prediction (from luma to chroma) of the current block. The parameters (e.g., α and β) of the cross-component prediction model 820 are derived by a model derivation module 840 from samples of one or more reference lines neighboring the current block. The samples of the multiple reference lines are provided by the reconstructed picture buffer 750 as reconstructed luma and chroma samples 806. A reference line selection module 830 selects one or more of the reference lines as source of the luma and chroma samples to be used for linear model derivation. When at least two reference lines are selected, the two reference lines may or may not be adjacent to each other. Indications of the selected reference line(s) may or may not be provided to the entropy encoder 790 to be signaled to the decoder.

In some embodiments, the model derivation module 840 combines samples from multiple different reference lines as one line of fused samples. In some embodiments, the model derivation module 840 may sub-sample luma samples without applying a down-sample filter.

In some embodiments, the model derivation module 840 derives multiple candidate linear models 825 for the multiple reference lines, such that the luma and chroma samples of each reference line are used to derive one corresponding candidate linear model. The cross-component prediction model 820 may determine a cost for each of the candidate models and identify the lowest cost candidate model (and its corresponding reference line). The cost of a candidate model (and therefore the corresponding reference line) may be the boundary matching cost computed based on (i) the predicted chroma samples generated by the candidate model at the boundary of the current block and (ii) the reconstructed chroma samples neighboring the current block.

Figure 9:
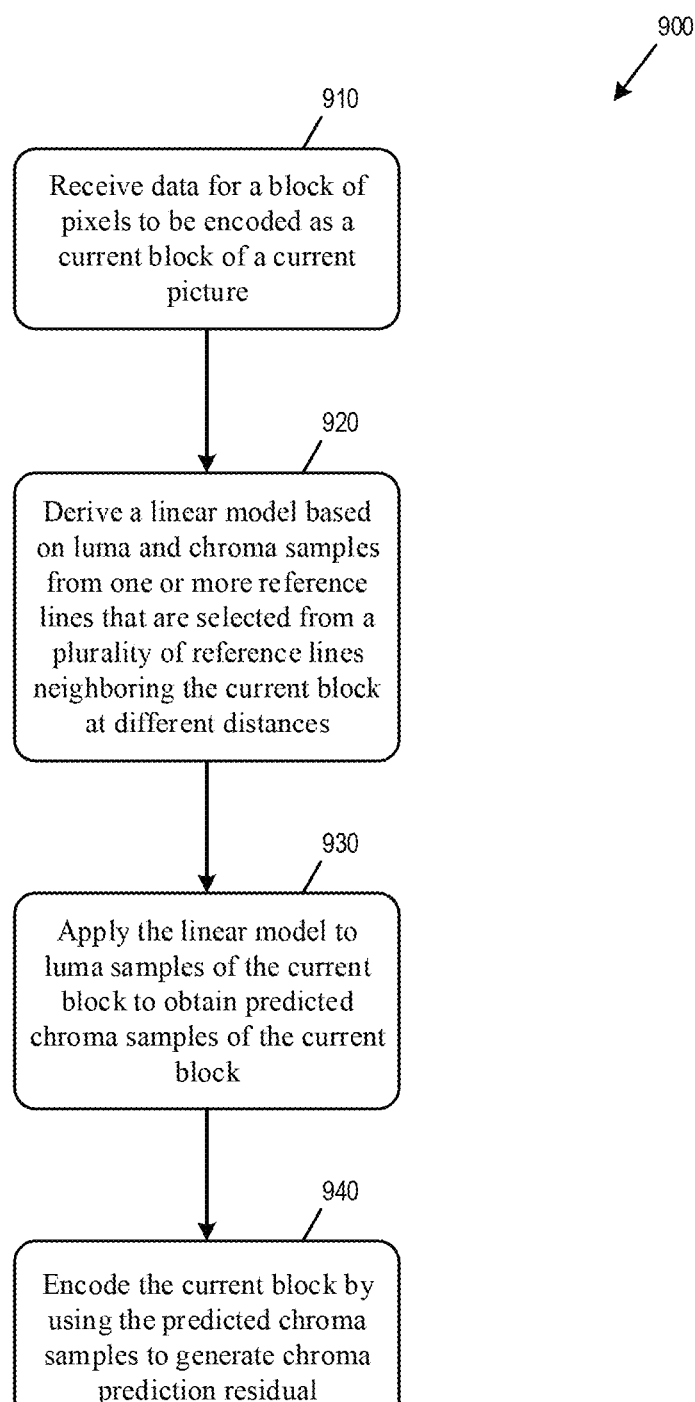
FIG. 9 conceptually illustrates a process for using multiple reference lines to perform cross-component prediction.

FIG. 9 conceptually illustrates a process 900 for using multiple reference lines to perform cross-component prediction. In some embodiments, one or more processing units (e.g., a processor) of a computing device implementing the encoder 700 performs the process 900 by executing instructions stored in a computer readable medium. In some embodiments, an electronic apparatus implementing the encoder 700 performs the process 900.

The encoder receives (at block 910) data for a block of pixels to be encoded as a current block of a current picture.

The encoder derives (at block 920) a linear model based on luma and chroma samples from one or more reference lines that are selected from a plurality of reference lines neighboring the current block at different distances. In some embodiments, at least one of the selected reference lines is adjacent to a boundary of the current block. In some embodiments, at least one of the selected reference lines is non-adjacent to a boundary of the current block. In some embodiments, the linear model is derived using luma and chroma samples of only one selected reference line. In some embodiments, the linear model is derived using luma and chroma samples of two or more selected reference lines. The two or more selected reference lines may or may not be adjacent to each other. In some embodiments, the luma samples and the chroma samples used for deriving the linear model may be of same or different selected reference lines. In some embodiments, the luma samples used for deriving the linear model are sub-sampled without applying a down-sampling filtering process, as described by reference to FIG. 4 above.

In some embodiments, the encoder signals a syntax element indicating whether more than one reference lines is selected from the plurality of reference lines for deriving the linear model. In some embodiments, the number of reference lines selected from the plurality of reference lines is determined based on a size of the current block or a cross-component prediction mode (e.g., CCLM_A, CCLM_L, CCLM_LA) used for the current block.

In some embodiments, the luma samples in the plurality of reference lines are combined into a line of fused luma samples and the chroma samples in the plurality of reference lines are combined onto a line of fused chroma samples. The linear model is derived based on the line of fused luma samples and the line of fused chroma samples. Each fused sample is a weighted average of samples within a window that encompass multiple reference lines.

In some embodiments, the linear model is derived from samples of one particular reference line that is selected from the plurality of reference lines for having a smallest boundary matching cost. The boundary matching cost of a reference line is determined based on a difference between (i) boundary chroma samples of the current block predicted by a candidate model of the reference line (by applying the candidate model to the boundary luma samples of the current block) and (ii) reconstructed chroma samples neighboring the current block.

The encoder applies (at block 930) the linear model to luma samples of the current block to obtain predicted chroma samples of the current block. The encoder encodes (at block 940) the current block by using the predicted chroma samples of the current block to generate chroma prediction residual of the current block.

V. Example Video Decoder

In some embodiments, an encoder may signal (or generate) one or more syntax element in a bitstream, such that a decoder may parse said one or more syntax element from the bitstream.

Figure 10:
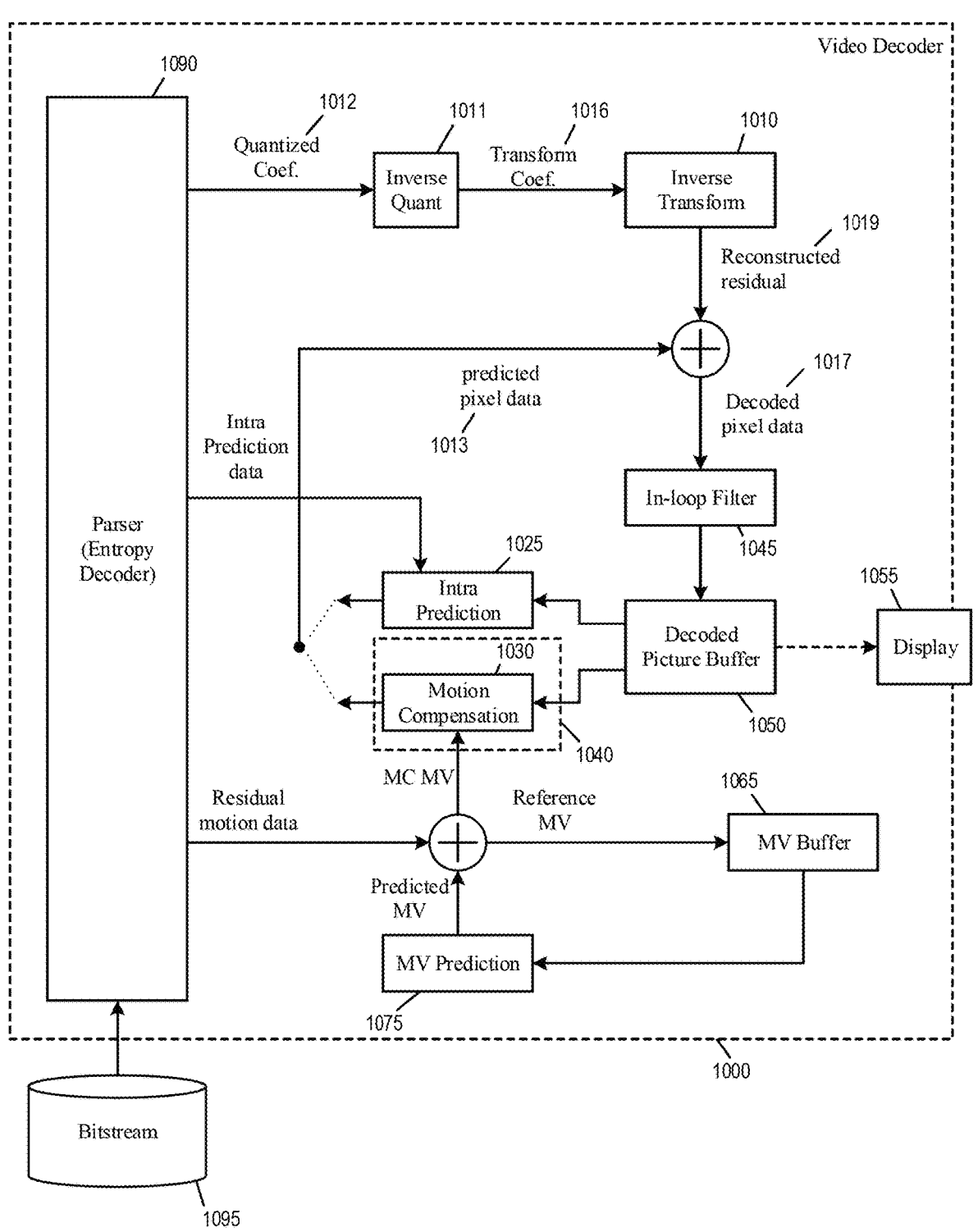
FIG. 10 illustrates an example video decoder that may implement cross-component prediction.

FIG. 10 illustrates an example video decoder 1000 that may implement cross-component prediction. As illustrated, the video decoder 1000 is an image-decoding or video-decoding circuit that receives a bitstream 1095 and decodes the content of the bitstream into pixel data of video frames for display. The video decoder 1000 has several components or modules for decoding the bitstream 1095, including some components selected from an inverse quantization module 1011, an inverse transform module 1010, an intra-prediction module 1025, a motion compensation module 1030, an in-loop filter 1045, a decoded picture buffer 1050, a MV buffer 1065, a MV prediction module 1075, and a parser 1090. The motion compensation module 1030 is part of an inter-prediction module 1040.

In some embodiments, the modules 1010-1090 are modules of software instructions being executed by one or more processing units (e.g., a processor) of a computing device. In some embodiments, the modules 1010-1090 are modules of hardware circuits implemented by one or more ICs of an electronic apparatus. Though the modules 1010-1090 are illustrated as being separate modules, some of the modules can be combined into a single module.

The parser 1090 (or entropy decoder) receives the bitstream 1095 and performs initial parsing according to the syntax defined by a video-coding or image-coding standard. The parsed syntax element includes various header elements, flags, as well as quantized data (or quantized coefficients) 1012. The parser 1090 parses out the various syntax elements by using entropy-coding techniques such as context-adaptive binary arithmetic coding (CABAC) or Huffman encoding.

The inverse quantization module 1011 de-quantizes the quantized data (or quantized coefficients) 1012 to obtain transform coefficients, and the inverse transform module 1010 performs inverse transform on the transform coefficients 1016 to produce reconstructed residual signal 1019. The reconstructed residual signal 1019 is added with predicted pixel data 1013 from the intra-prediction module 1025 or the motion compensation module 1030 to produce decoded pixel data 1017. The decoded pixels data are filtered by the in-loop filter 1045 and stored in the decoded picture buffer 1050. In some embodiments, the decoded picture buffer 1050 is a storage external to the video decoder 1000. In some embodiments, the decoded picture buffer 1050 is a storage internal to the video decoder 1000.

The intra-prediction module 1025 receives intra-prediction data from bitstream 1095 and according to which, produces the predicted pixel data 1013 from the decoded pixel data 1017 stored in the decoded picture buffer 1050. In some embodiments, the decoded pixel data 1017 is also stored in a line buffer (not illustrated) for intra-picture prediction and spatial MV prediction.

In some embodiments, the content of the decoded picture buffer 1050 is used for display. A display device 1055 either retrieves the content of the decoded picture buffer 1050 for display directly, or retrieves the content of the decoded picture buffer to a display buffer. In some embodiments, the display device receives pixel values from the decoded picture buffer 1050 through a pixel transport.

The motion compensation module 1030 produces predicted pixel data 1013 from the decoded pixel data 1017 stored in the decoded picture buffer 1050 according to motion compensation MVs (MC MVs). These motion compensation MVs are decoded by adding the residual motion data received from the bitstream 1095 with predicted MVs received from the MV prediction module 1075.

The MV prediction module 1075 generates the predicted MVs based on reference MVs that were generated for decoding previous video frames, e.g., the motion compensation MVs that were used to perform motion compensation. The MV prediction module 1075 retrieves the reference MVs of previous video frames from the MV buffer 1065. The video decoder 1000 stores the motion compensation MVs generated for decoding the current video frame in the MV buffer 1065 as reference MVs for producing predicted MVs.

The in-loop filter 1045 performs filtering or smoothing operations on the decoded pixel data 1017 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 11:
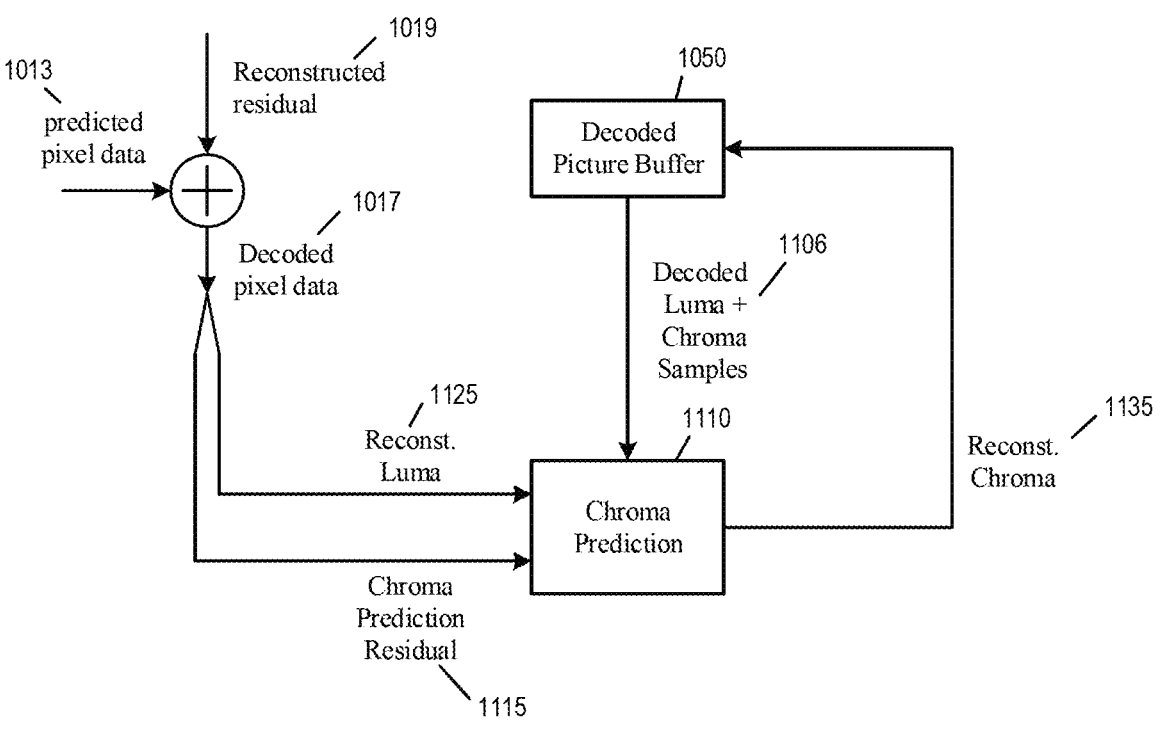
FIG. 11 illustrates portions of the video decoder that implement linear model derivation based on multiple reference lines.
Figure 11:
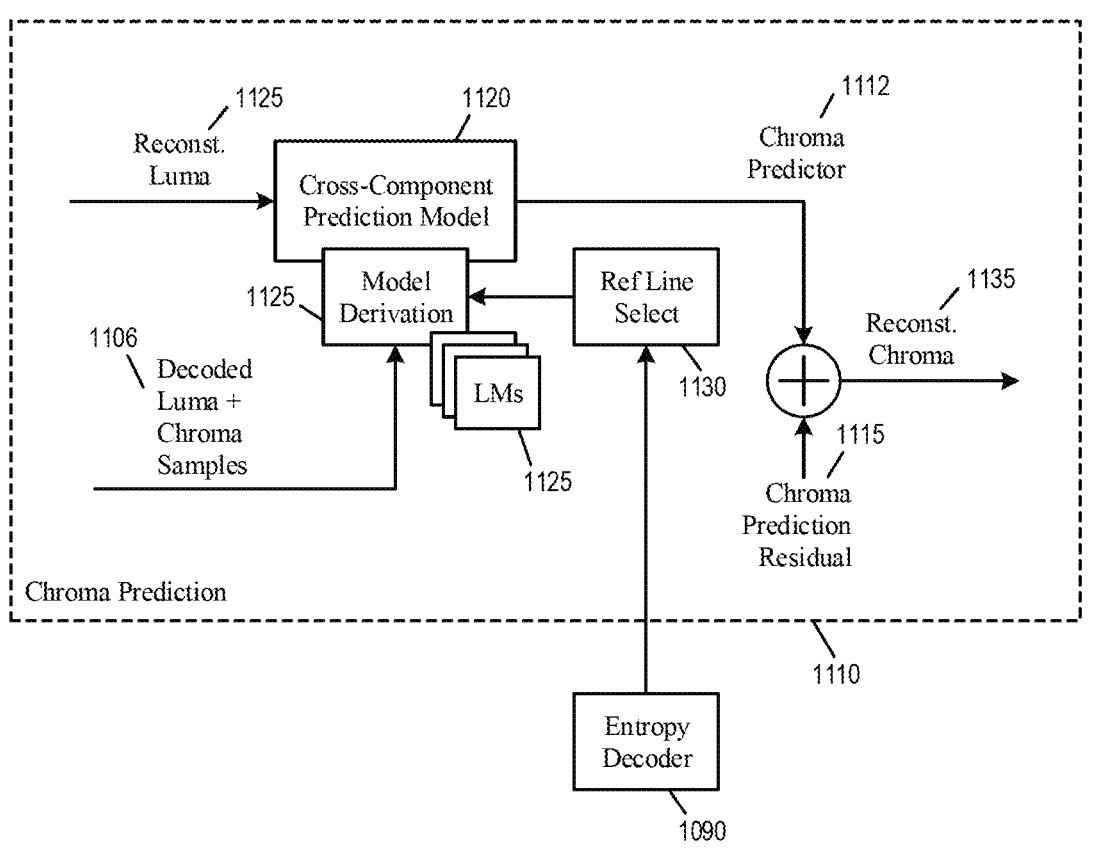

FIG. 11 illustrates portions of the video decoder 1000 that implement linear model derivation based on multiple reference lines. As illustrated, the decoded picture buffer 1050 provides decoded luma and chroma samples to a chroma prediction module 1110, which produces reconstructed chroma samples 1135 for display or output by predicting chroma samples based on luma samples.

The chroma prediction module 1110 receives the decoded pixel data 1017, which includes reconstructed luma samples 1125 and chroma prediction residual 1115. The chroma prediction module 1110 uses the reconstructed luma samples 1125 to produce a chroma predictor 1112. The chroma predictor 1112 is then added with the chroma prediction residual 1115 to produce the reconstructed chroma samples 1135. The reconstructed chroma samples 1135 are then stored in the decoded picture buffer 1050 for display and for reference by subsequent blocks and pictures.

The cross-component prediction model 1120 is a linear model for cross-component prediction (from luma to chroma) of the current block. The parameters (e.g., $\alpha$ and $\beta$) of the cross-component prediction model 1120 are derived by a model derivation module 1140 from samples of one or more reference lines neighboring the current block. The samples of the multiple reference lines are provided by the decoded picture buffer 1050 as reconstructed luma and chroma samples 1106. A reference line selection module 1130 selects one or more of the reference lines as source of the luma and chroma samples to be used for linear model derivation. When at least two reference lines are selected, the two reference lines may or may not be adjacent to each other. The entropy decoder 1090 may provide indications of the selected reference line(s) that are parsed from the bitstream 1095.

In some embodiments, the model derivation module 1140 combines samples from multiple different reference lines as one line of fused samples. In some embodiments, the model derivation module 1140 may sub-sample luma samples without applying a down-sample filter.

In some embodiments, the model derivation module 1140 derives multiple candidate linear models 1125 for the multiple reference lines, such that the luma and chroma samples of each reference line are used to derive one corresponding candidate linear model. The cross-component prediction model 1120 may determine a cost for each of the candidate models and identify the lowest cost candidate model (and its corresponding reference line). The cost of a candidate model (and therefore the corresponding reference line) may be the boundary matching cost computed based on (i) the predicted chroma samples generated by the candidate model at the boundary of the current block and (ii) the reconstructed chroma samples neighboring the current block.

Figure 12:
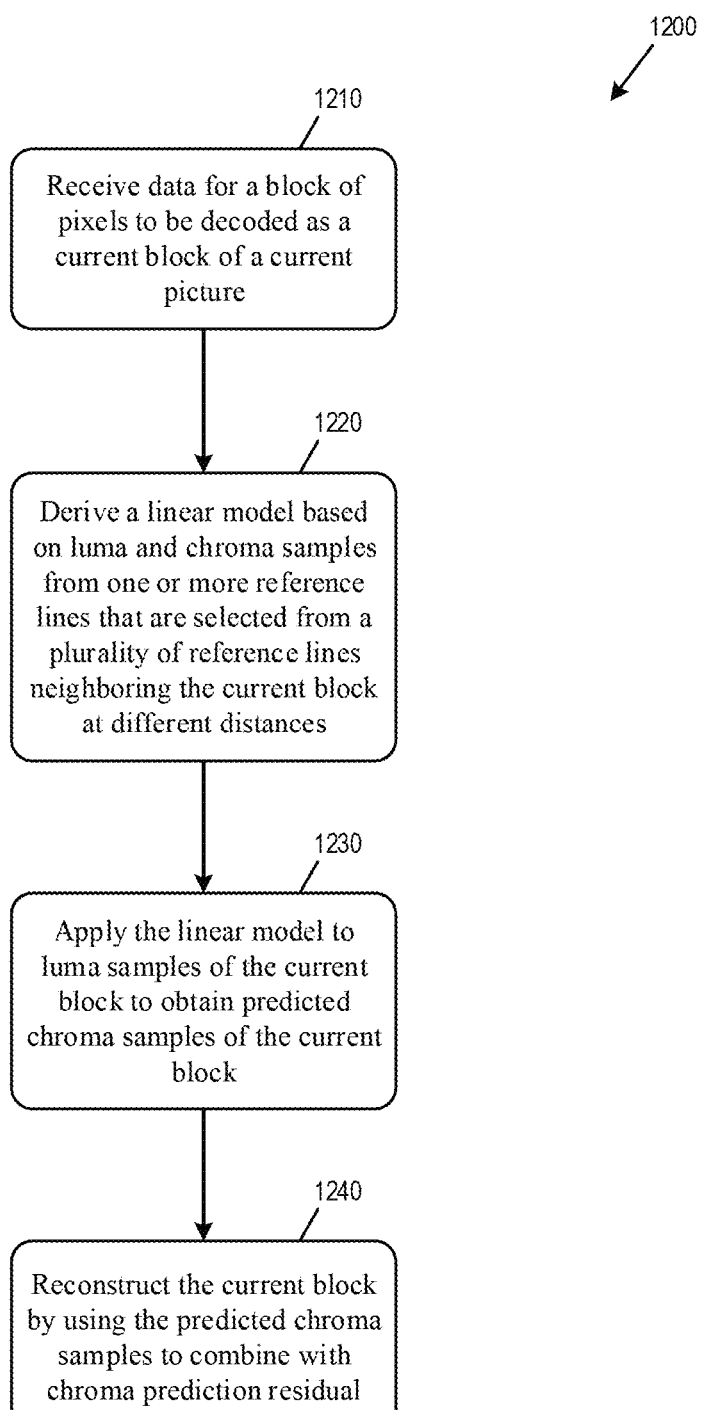
FIG. 12 conceptually illustrates a process for using multiple reference lines to perform cross-component prediction.

FIG. 12 conceptually illustrates a process 1200 for using multiple reference lines to perform cross-component prediction. In some embodiments, one or more processing units (e.g., a processor) of a computing device implementing the decoder 1000 performs the process 1200 by executing instructions stored in a computer readable medium. In some embodiments, an electronic apparatus implementing the decoder 1000 performs the process 1200.

The decoder receives (at block 1210) data for a block of pixels to be decoded as a current block of a current picture.

The decoder derives (at block 1220) a linear model based on luma and chroma samples from one or more reference lines that are selected from a plurality of reference lines neighboring the current block at different distances. In some embodiments, at least one of the selected reference lines is adjacent to a boundary of the current block. In some embodiments, at least one of the selected reference lines is non-adjacent to a boundary of the current block. In some embodiments, the linear model is derived using luma and chroma samples of only one selected reference line. In some embodiments, the linear model is derived using luma and chroma samples of two or more selected reference lines. The two or more selected reference lines may or may not be adjacent to each other. In some embodiments, the luma samples and the chroma samples used for deriving the linear model may be of same or different selected reference lines. In some embodiments, the luma samples used for deriving the linear model are sub-sampled without applying a down-sampling filtering process, as described by reference to FIG. 4 above.

In some embodiments, the decoder receives a syntax element indicating whether more than one reference lines is selected from the plurality of reference lines for deriving the linear model. In some embodiments, the number of reference lines selected from the plurality of reference lines is determined based on a size of the current block or a cross-component prediction mode (e.g., CCLM_A, CCLM_L, CCLM_LA) used for the current block.

In some embodiments, the luma samples in the plurality of reference lines are combined into a line of fused luma samples and the chroma samples in the plurality of reference lines are combined onto a line of fused chroma samples. The linear model is derived based on the line of fused luma samples and the line of fused chroma samples. Each fused sample is a weighted average of samples within a window that encompass multiple reference lines.

In some embodiments, the linear model is derived from samples of one particular reference line that is selected from the plurality of reference lines for having a smallest boundary matching cost. The boundary matching cost of a reference line is determined based on a difference between (i) boundary chroma samples of the current block predicted by a candidate model of the reference line (by applying the candidate model to the boundary luma samples of the current block) and (ii) reconstructed chroma samples neighboring the current block.

The decoder applies (at block 1230) the linear model to luma samples of the current block to obtain predicted chroma samples of the current block. The decoder reconstructs (at block 1240) the current block by using the predicted chroma samples of the current block (to combine with chroma prediction residuals.) The decoder may then provide the reconstructed current block for display as part of the reconstructed current picture.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 13:
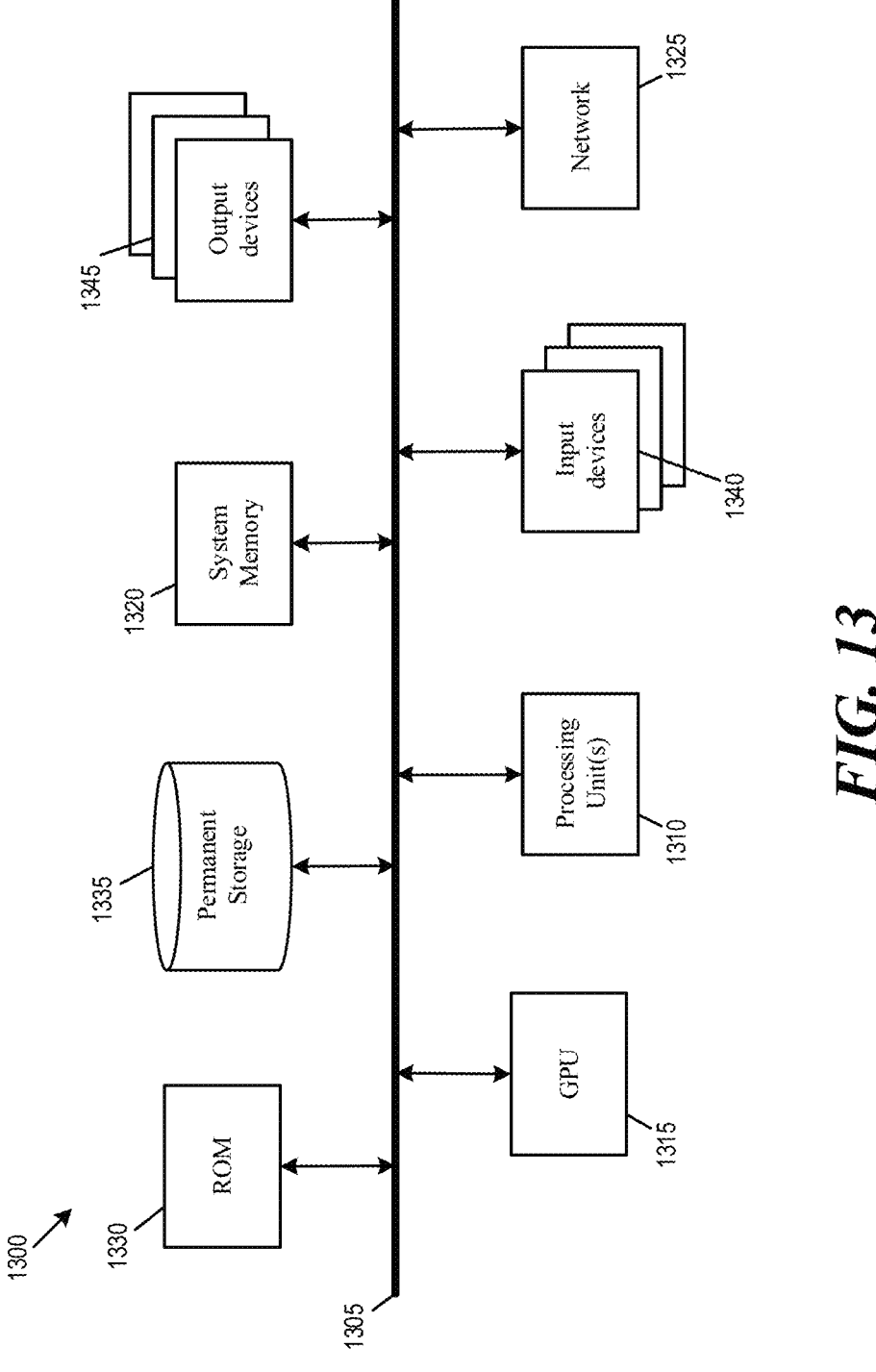
FIG. 13 conceptually illustrates an electronic system with which some embodiments of the present disclosure are implemented.

FIG. 13 conceptually illustrates an electronic system 1300 with which some embodiments of the present disclosure are implemented. The electronic system 1300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1300 includes a bus 1305, processing unit(s) 1310, a graphics-processing unit (GPU) 1315, a system memory 1320, a network 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the GPU 1315, the read-only memory 1330, the system memory 1320, and the permanent storage device 1335.

From these various memory units, the processing unit(s) 1310 retrieves instructions to execute and data to process in order to execute the processes of the present disclosure. The processing unit(s) may be a single processor or a multi-core processor in different embodiments. Some instructions are passed to and executed by the GPU 1315. The GPU 1315 can offload various computations or complement the image processing provided by the processing unit(s) 1310.

The read-only-memory (ROM) 1330 stores static data and instructions that are used by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the present disclosure use a mass-storage device (such as a magnetic or optical disk and its corresponding disk drive) as the permanent storage device 1335.

Other embodiments use a removable storage device (such as a floppy disk, flash memory device, etc., and its corresponding disk drive) as the permanent storage device. Like the permanent storage device 1335, the system memory 1320 is a read-and-write memory device. However, unlike storage device 1335, the system memory 1320 is a volatile read-and-write memory, such a random access memory. The system memory 1320 stores some of the instructions and data that the processor uses at runtime. In some embodiments, processes in accordance with the present disclosure are stored in the system memory 1320, the permanent storage device 1335, and/or the read-only memory 1330. For example, the various memory units include instructions for processing multimedia clips in accordance with some embodiments. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1325 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 9 and FIG. 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:
receiving data for a block of pixels to be encoded or decoded as a current block of a current picture;
deriving a linear model based on luma and chroma samples from one or more reference lines that are selected from a plurality of reference lines neighboring the current block at different distances, wherein the linear model is derived from samples of one particular reference line that is selected from the plurality of reference lines for having a smallest boundary matching cost, wherein the boundary matching cost of a reference line is determined based on a difference between (i) boundary chroma samples of the current block predicted by a candidate model of the reference line and (ii) reconstructed chroma samples neighboring the current block;
applying the linear model to luma samples of the current block to obtain predicted chroma samples of the current block; and
encoding or decoding the current block by using the predicted chroma samples of the current block.

2. The video coding method of claim 1, wherein the linear model is derived using luma and chroma samples of only one selected reference line.

3. The video coding method of claim 1, wherein the linear model is derived using luma and chroma samples of two or more selected reference lines.

4. The video coding method of claim 3, wherein the two or more selected reference lines are adjacent to each other.

5. The video coding method of claim 3, wherein the two or more selected reference lines are not adjacent to each other.

6. The video coding method of claim 1, wherein at least one of the selected reference lines is adjacent to a boundary of the current block.

7. The video coding method of claim 1, wherein at least one of the selected reference lines is non-adjacent to a boundary of the current block.

8. The video coding method of claim 1, wherein the luma samples used for deriving the linear model are of a first selected reference line and the chroma samples used for deriving the linear model are of a second reference line that is different than the first selected reference line.

9. The video coding method of claim 1, wherein the luma and chroma samples used for deriving the linear model are of a same selected reference line.

10. The video coding method of claim 1, wherein the luma samples used for deriving the linear model are sub-sampled without using a filter.

11. The video coding method of claim 1, wherein the luma samples in the plurality of reference lines are combined into a line of fused luma samples and the chroma samples in the plurality of reference lines are combined onto a line of fused chroma samples, wherein the linear model is derived based on the line of fused luma samples and the line of fused chroma samples, where each fused sample is a weighted average of samples within a window that encompass multiple reference lines.

12. The video coding method of claim 1, further comprising receiving or signaling a syntax element indicating whether more than one reference lines is selected from the plurality of reference lines for deriving the linear model.

13. The video coding method of claim 1, wherein a number of reference lines selected from the plurality of reference lines is determined based on a size of the current block or a mode of a cross-component prediction (CCLM_A, CCLM_L, CCLM_LA) used for the current block.

14. An electronic apparatus comprising:

a video coder circuit configured to perform operations comprising:

receiving data for a block of pixels to be encoded or decoded as a current block of a current picture;

deriving a linear model based on luma and chroma samples from one or more reference lines that are selected from a plurality of reference lines neighboring the current block at different distances, wherein the linear model is derived from samples of one particular reference line that is selected from the plurality of reference lines for having a smallest boundary matching cost, wherein the boundary matching cost of a reference line is determined based on a difference between (i) boundary chroma samples of the current block predicted by a candidate model of the reference line and (ii) reconstructed chroma samples neighboring the current block;

applying the linear model to luma samples of the current block to obtain predicted chroma samples of the current block; and encoding or decoding the current block by using the predicted chroma samples of the current block.

15. A video decoding method comprising:

receiving data for a block of pixels to be decoded as a current block of a current picture;

deriving a linear model based on luma and chroma samples from one or more reference lines that are selected from a plurality of reference lines neighboring the current block at different distances, wherein the linear model is derived from samples of one particular reference line that is selected from the plurality of reference lines for having a smallest boundary matching cost, wherein the boundary matching cost of a reference line is determined based on a difference between (i) boundary chroma samples of the current block predicted by a candidate model of the reference line and reconstructed chroma samples neighboring the current block;

applying the linear model to luma samples of the current block to obtain predicted chroma samples of the current block; and reconstructing the current block by using the predicted chroma samples of the current block.

* * * * *